G. D. POGUE.
RETAINING MEANS FOR BOLTS AND SIMILAR DEVICES.
APPLICATION FILED FEB. 17, 1917.
1,229,783.
Patented June 12, 1917.
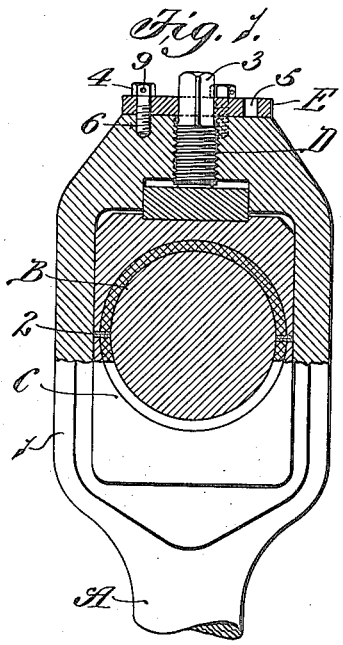
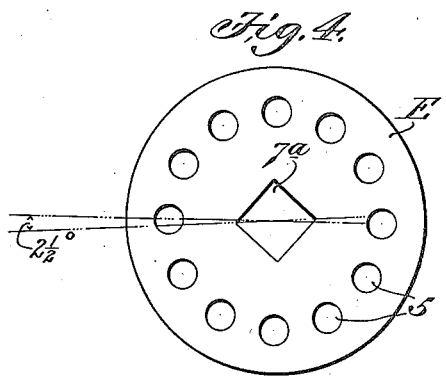
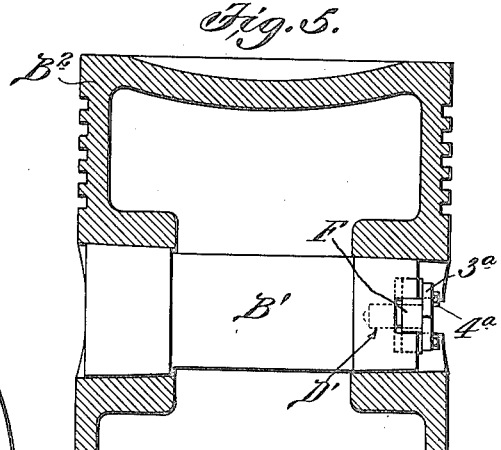
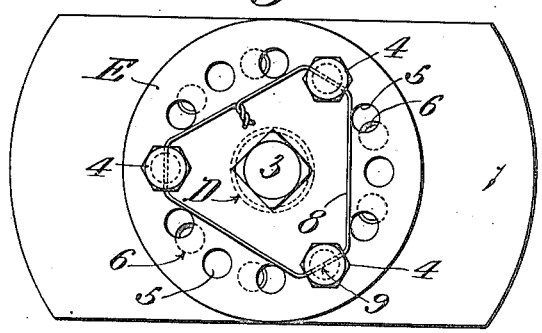
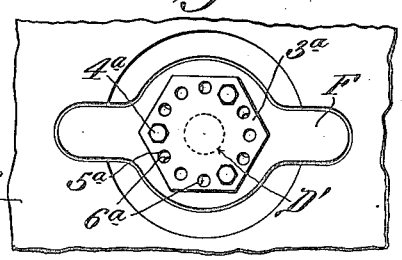
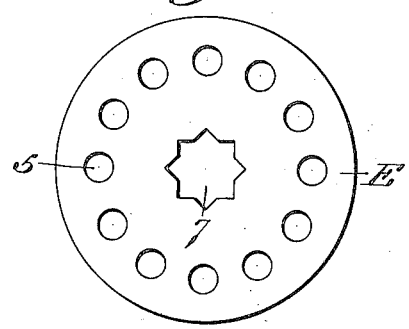
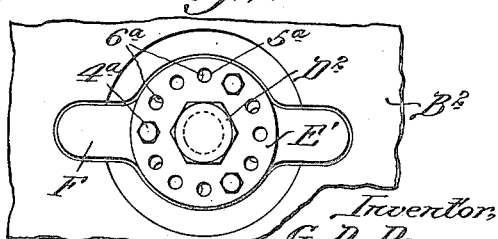
Inventor,
G. D. Pogue.
By Bakewell & Cornwell attys.

UNITED STATES PATENT OFFICE.

GEORGE D. POGUE, OF ST. LOUIS, MISSOURI.

RETAINING MEANS FOR BOLTS AND SIMILAR DEVICES.

1,229,783. Specification of Letters Patent. Patented June 12, 1917.

Application filed February 17, 1917. Serial No. 149,349.

*To all whom it may concern:*

Be it known that I, GEORGE D. POGUE, a citizen of the United States, residing at St. Louis, Missouri, have invented a certain new and useful Improvement in Retaining Means for Bolts and Similar Devices, of which the following is a full, clear, and exact description, such as will enable others skilled in the art to which it appertains to make and use the same.

This invention relates to a novel means for retaining an adjustable element in adjusted position.

In order to secure safe and satisfactory operation of heavy reciprocating machines, the bolts employed in the adjustment of the bearings must be closely adjusted and permanently retained. This is particularly true of the bolts used to adjust the piston pin bearings on heavy oil engines of the Diesel type, and also of the bolts used to retain taper-fitted piston pins in their pistons. Bolts used for the purposes mentioned must be provided with screw threads of relatively coarse pitch in order to secure sufficient strength. For instance, in a bolt two inches in diameter it has been found desirable in practice to provide approximately five threads per inch, each complete revolution of the bolt resulting in a longitudinal travel of 0.200″. Therefore, in making a close and accurate adjustment of a piston pin bearing it is essential that the retaining means for the adjusting bolt should be operable at almost any angle in which the bolt happens to be when the adjustment is completed. This is also true of the retaining means employed with a bolt that is used to retain a taper-fitted piston pin in its piston.

One object of my invention is to provide a novel retaining means for an adjustable element which permits said element to be set in a large number of positions and then securely locked.

Another object is to provide a simple and effective retaining means for a bolt, machine screw or similar device which will permit said bolt or device to be rotated to almost any desired angle and there retained.

To this end I have devised a retaining means that consists of a stationary part provided with a group of holes or spaces, a movable part that moves with the adjustable element to be retained and which is provided with a group of holes or spaces arranged in different spaced relation to the holes in said stationary part, and a device that is adapted to be inserted in alined holes in said parts, so as to hold the adjustable element in adjusted position. It is immaterial, so far as my broad idea is concerned, what the adjustable element consists of, and it is also immaterial whether the movable part of the structure previously referred to is integrally connected to or detachably connected to the adjustable element of the structure. My invention is particularly adapted for use in structures wherein the adjustable element to be retained consists of a bolt or shank provided with screw threads of relatively coarse pitch, and therefore, I have illustrated by invention embodied in a retaining means for a piston pin bearing adjusting bolt and a retaining means for a bolt that is used to hold a taper-fitted piston pin in its piston. I wish it to be understood, however, that the invention is not limited to use with bolts of the character referred to, for it can be used in various kinds of structures that comprise a part that requires close and accurate adjustment.

Figure 1 of the drawings is a vertical sectional view illustrating a connecting rod equipped with a means constructed in accordance with my invention for retaining or holding the bolt used to adjust the piston pin bearing.

Fig. 2 is a top plan view of the structure shown in Fig. 1.

Figs. 3 and 4 are top plan views of retaining plates of slightly different construction from the one shown in Figs. 1 and 2.

Fig. 5 is a vertical sectional view of a piston equipped with a taper-fitted piston pin and provided with a means constructed in accordance with my invention for holding the bolt that is used to retain the piston pin in the piston.

Fig. 6 is a side elevational view of a portion of the piston shown in Fig. 5; and Fig. 7 is a side elevational view of a portion of a piston, illustrating a slight modification of my invention.

Referring to Fig. 1 of the drawings, A designates a connecting rod, B designates a piston pin, C designates a two-part bearing for said piston pin arranged in a bearing housing 1 on the connecting rod A and D designates a bolt that is used for adjusting the piston pin bearing, the two parts of said bearing being separated by shims 2 and the adjusting bolt D being mounted in a screw-threaded opening in the portion 1 of the connecting rod, as is now the usual practice in Diesel engines and various other kinds of machines. My invention consists in a novel means for retaining the bolt D in adjusted position, and in the form of my invention herein illustrated said means consists of a retaining plate E that is adapted to be arranged in engagement with the head 3 of the bolt D, and a plurality of machine screws or bolts 4 for connecting said plate E to the portion 1 of the connecting rod in which the bolt D is adjustably mounted. The plate E is provided with a center hole of the same cross-sectional shape and dimensions as the head 3 of the bolt D, so that it can be slipped over the bolt head, and said plate is also provided with a group of non-screw-threaded holes 5 that are arranged concentrically around the bolt head hole in the center of the plate E for receiving the screws or bolts 4 that secure the plate E to the connecting rod. The portion 1 of the connecting rod on which the plate E is arranged is also provided with a group of holes 6 that are arranged concentrically with relation to the bolt D, but the holes 6 in the connecting rod are screw-threaded, so that the retaining bolts 4 can be screwed into same. The non-threaded holes 5 in the plate E are equally spaced and the threaded holes 6 in the connecting rod are also equally spaced, but the number of holes in the plate E differs from the number of holes 6 in the connecting rod, so that the two groups of holes will be spaced in different relation. It is immaterial, so far as my invention is concerned, how many holes are used to form the two groups of holes in the plate E and in the connecting rod, but it is essential that the number of holes in both groups be divisible by a third number represented by the number of retaining bolts or screws 4 used to hold the plate E in adjusted position. For instance, if three bolts 4 are used to hold the plate E, said plate may be provided with twelve holes 5 and the portion 1 of the connecting rod on which said plate rests provided with nine holes 6, as both of these numbers are divisible by three.

The plate E securely holds the bolt D in adjusted position, and after the bolts 4 have been removed, the bolt D and plate E can be turned to adjust the piston pin bearing and can thereafter be securely locked in adjusted position by arranging the retaining bolts 4 in different coöperating holes in the plate E and in the connecting rod. With such a construction it is possible to make a very close and accurate adjustment of the bolt D and then permanently retain said bolt in adjusted position, owing to the fact that each ten degrees of axial movement of the plate E brings three of the holes 5 in said plate into alinement with three of the tapped holes 6 in the connecting rod. If twelve holes were provided in the connecting rod, and fifteen holes in the plate E, three equally spaced holes of each group of holes would register each six degrees of axial movement of the plate E.

If it is desirable or necessary to use only a few holes in the plate E and only a few holes in the connecting rod, the same result accomplished by using a large number of holes in the stationary part and movable part of the structure can be obtained by making the bolt head hole 7 in the plate E of such shape that the plate E can be moved into different positions with relation to the bolt D. For example, the plate E can be provided with a center hole 7 that has eight notches, as shown in Fig. 3, thereby doubling the number of angles at which the adjustment of the bolt may be held. Still another slight change that can be made to increase the range of adjustability is shown in Fig. 4, wherein the bolt head hole 7ª in the plate E is arranged with its sides at an angle of about two and one-half degrees to a line drawn through the axes of two diametrically opposite holes 5 in said plate. With a plate E provided with a center hole arranged in the manner shown in Fig. 4, the adjusting bolt D can be advanced by steps of five degrees and securely retained in adjusted position, by reversing the plate E. It is of course immaterial whether the bolt D being held is provided with a square head or hexagonal or octagonal shaped head, but it is essential that the opening in the plate E which receives the head of the bolt be of such shape that the bolt cannot turn relatively to said plate when the plate E is in operative position. Any means may be used to lock the retaining bolts 4 and prevent them from working loose, but the means that I prefer to use consists of a piece of wire 8 that can be run through holes 9 in the heads of the bolts 4 and its ends twisted or connected together in any suitable manner, as shown in Fig. 2.

While I prefer to use a plate E or other device that is separate and distinct from the adjustable element being held, I wish it to be understood that my broad idea is not limited to a retaining means in which the part that is provided with one set of holes is detachably connected to the adjustable element being held, for the same results can be accomplished by forming holes in an integral portion of the adjustable element being held, such, for example, as by forming holes directly in the head of the bolt, instead of in a plate that is slipped over the head of the bolt, as in the form of my invention shown in Fig. 1. Therefore, wherever I have used the expression "adjustable part" in the claims, I mean to include by this expression either a plate or similar device detachably connected to the adjustable element being held or an integral part on said element, such, for example, as the head 3ᵃ of the bolt D', shown in Figs. 5 and 6 of the drawings. In the structure shown in Figs. 5 and 6 the bolt D' is used to retain a taper-fitted piston pin B' in its piston B². The head 3ᵃ of the bolt D' bears against a non-rotatable member F in the piston, and the shank of said bolt passes through said member F and is tapped into the piston pin B', thereby enabling the piston pin to be drawn tightly into the opening provided for same in the piston, by tightening the bolt D'. The head 3ᵃ of the bolt D' is provided with a group of non-tapped holes 5ᵃ, and the member F is provided with a group of tapped holes 6ᵃ, thereby enabling retaining screws 4ᵃ to be inserted through alined holes in the head of the bolt D' and in the member F, when it is desired to secure said bolt in adjusted position. The number of holes 5ᵃ in the head of the bolt D' differs from the number of holes 6ᵃ in the member F, but the number of holes in each group is divisible by a third number represented by a number of retaining bolts 4ᵃ that are used. Such a structure has the same desirable characteristics as the structure shown in Figs. 1 and 2, namely, it permits the bolt D' to be adjusted closely and thereafter securely locked in adjusted position.

In Fig. 7 of the drawings I have shown a retaining means for a piston pin bolt D² that differs slightly from the means illustrated in Figs. 5 and 6, in that it comprises a plate E' similar to the plate E of the structure shown in Figs. 1 and 2 that is provided with a center opening for receiving the head of the bolt D². Said plate E' is provided with a group of non-threaded holes that are arranged in different spaced relation to a group of tapped holes in the member F, and retaining bolts 4ᵃ are employed for securing the plate E' to the member F, after the bolt D² has been adjusted properly. In the claims I have used the term "stationary part" to designate that portion of the structure in which the adjustable element is mounted or through which said element passes, and which is stationary with respect to the movement of the adjustable element, it being of course immaterial whether said part constitutes a moving part or a stationary part of the complete structure.

Having thus described my invention, what I claim, and desire to secure by Letters Patent, is:

1. The combination of a stationary part provided with a group of holes, an adjustable part provided with a group of holes, and a plurality of devices that are adapted to be inserted in alined holes in said parts to hold said adjustable part in adjusted position, the number of holes in each of said groups being divisible by a third number represented by the number of devices that are arranged in the alined holes in said parts.

2. The combination of a stationary part provided with a group of equally spaced holes, an adjustable rotatable part provided with a group of equally spaced holes that comprises a different number of holes than the group in said stationary part, a plurality of devices that are adapted to be inserted in alined holes in said parts to secure said adjustable part, and means for preventing said devices from becoming displaced accidentally.

3. A retaining means for bolts, machine screws and similar devices provided with non-circular-shaped heads, comprising a plate provided with an opening of such shape that when the plate is applied to the head of the bolt it will turn with the bolt, said plate having a group of equally spaced, non-threaded holes that are arranged concentric with a group of tapped holes in a stationary part through which the shank of the bolt passes, and a plurality of retaining devices that are adapted to be introduced into alined holes in said plate and stationary part so as to secure the bolt in adjusted position, the number of holes in both groups being divisible by a third number represented by the number of retaining devices used.

4. The combination of a bolt adjustably mounted in a stationary part and provided with a non-circular-shaped head, a member that is adapted to be arranged in engagement with the head of said bolt and provided with a group of equally spaced holes arranged concentrically about the axis of the bolt, a group of tapped holes in said stationary part arranged in different spaced relation to the holes in said member but concentric with the axis of the bolt, retaining devices that are adapted to be inserted through the holes in said member and screwed into said part, and means for preventing said retaining devices from working loose.

GEORGE D. POGUE.